Patented June 10, 1930

1,762,709

UNITED STATES PATENT OFFICE

EARL BURNARD ALVORD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

FUNGICIDE

No Drawing. Application filed September 7, 1926. Serial No. 134,145.

The present invention relates to fungicidal preparations adapted to be applied to foliage, and more specifically to fungicides containing compounds of copper.

It is known that copper compounds are effective fungicides. For example, copper compounds have won a wide use as fungicides in "Bordeaux mixtures" and the like. However, the copper compounds, as heretofore used, have been open to the disadvantage that they have a tendency to burn the foliage to which they are applied. Particularly is this true with regard to their damage to delicate plant foliage.

It has been thought that the burning of foliage by "Bordeaux mixture" might be explained either by improper mixing of the composition, or by a probable reformation of copper sulphate due to a double decomposition of the copper hydrate and calcium sulphate brought about by the carbon dioxide of the air. Whatever may be the true explanation of the burning action of the well-known copper-containing fungicidal preparations, it is a fact that they cannot be used at all on certain classes of foliage because of the disadvantage hereinbefore described.

The present invention obviates this disadvantage by combining copper and sulphur— both of which are known to be good fungicides—in the form of copper sulphide; preferably freshly precipitated, and even better in the form of colloidal copper sulphide. It has been found that copper sulphide, and to an even greater extent colloidal copper sulphide, combines the excellent fungicidal properties of the heretofore used copper compounds with the very advantageous property of not burning delicate foliage. It has been demonstrated to be an effective fungicide on peaches and beans.

Copper sulphide, in the form of a finely divided or colloidal product, is adaptable for use either in liquid or dry fungicidal and insecticidal preparations.

Although the present invention is not limited to any specific method of preparing copper sulphide, I have found that the product prepared according to the process described in the copending United States application of Mr. E. A. Craver, Ser. No. 144,189, filed October 25, 1926, is efficacious. According to said process a true copper sulphide colloid is prepared by treating an aqueous solution of a soluble salt of copper with a soluble sulphide in the presence of a dispersion agent such as, for example, the product known as "gulac" (i. e., the product obtained by evaporating cellulose waste liquor to dryness). As one manner in which this procedure may be carried out, an aqueous solution of copper sulphate is slowly added to an aqueous solution of gulac, with constant stirring, and, at the same time, hydrogen sulphide is bubbled through the gulac solution at a rate so regulated that the presence of a slight excess of hydrogen sulphide in said solution is insured. The resulting suspended particles of colloidal copper sulphide are of ultramicroscopic size (i. e., not discernible in microscopic examination at 800 magnifications); the colloidal solution may be evaporated to dryness, the dry residue powdered, and the powdered residue redissolved in water to the resumption of a completely clear colloidal solution and without detriment to the colloidality of the original colloidal copper suphide. The free acid content of the colloidal copper sulphide solution may be neutralized by converting it to a soluble, or insoluble, sulphate such as for instance calcium sulphate, by treatment with the requisite amount of an appropriate neutralizing agent.

Colloidal copper sulphide also may be prepared by reacting solutions of substantially equimolecular amounts of copper sulphate and barium sulphide, or sodium sulphide, in the presence of an aqueous solution of gulac. In aqueous preparations the colloidal copper sulphide appears to form a true hydrosol, does not precipitate or agglomerate on standing and does not obstruct the nozzles of spraying devices. The colloidal form of the fungicide causes it to cling closely to the leaves of plants. Its particles being highly dispersed, it is economical in use.

A finely divided copper sulphide product also may be prepared by sufficiently disintegrating copper sulphide in the presence of a deflocculating agent.

I claim:

1. As a fungicide colloidal copper sulphide.

2. As a fungicide a liquid composition containing colloidal copper sulphide in a liquid vehicle containing a colloidal dispersion agent.

In testimony whereof, I affix my signature.

EARL BURNARD ALVORD.